Patented June 7, 1938

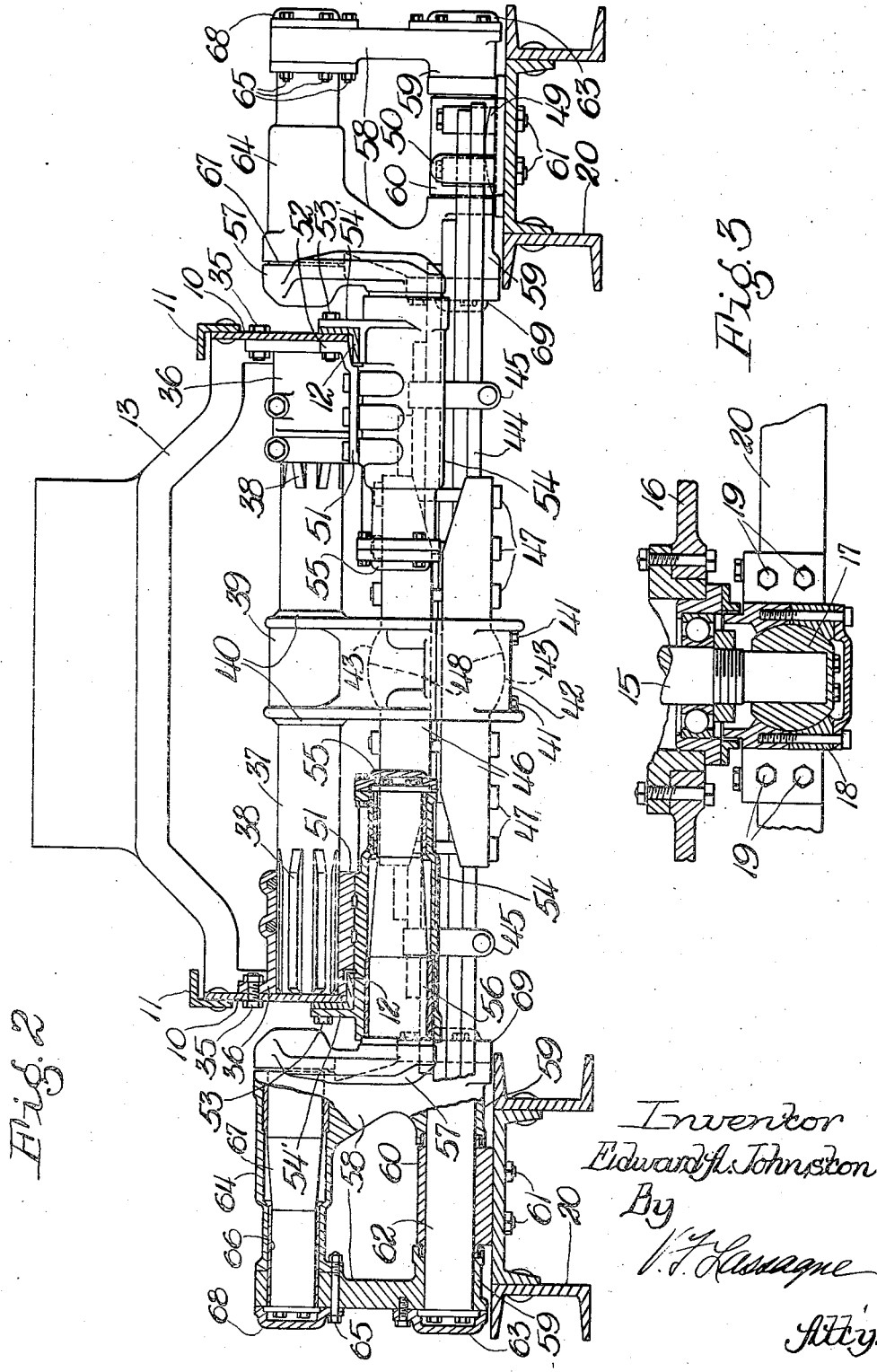

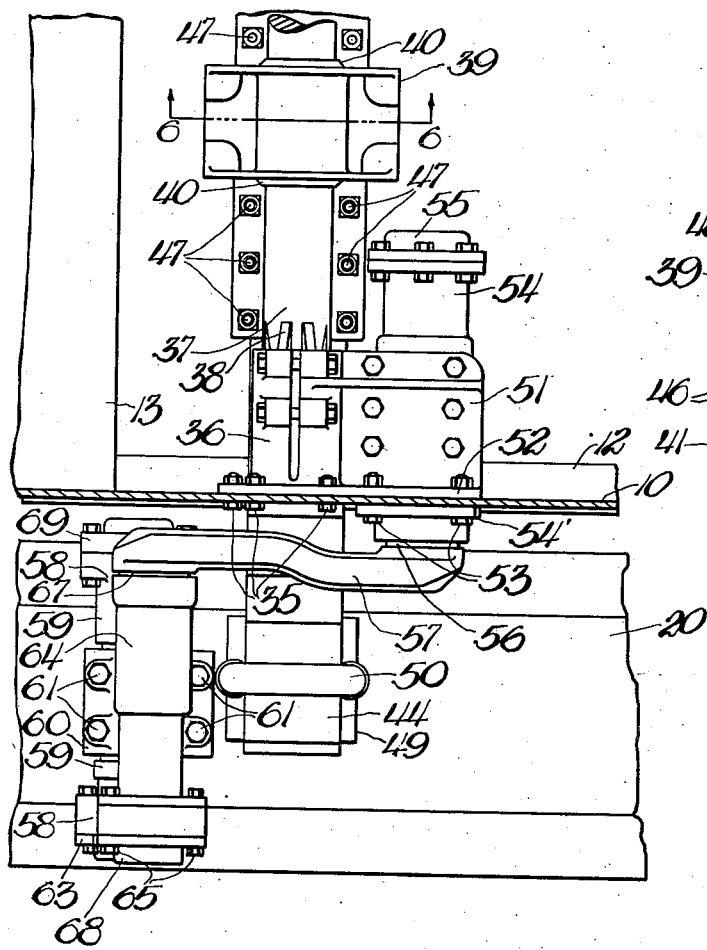
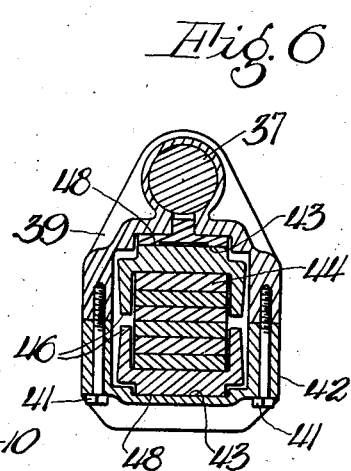
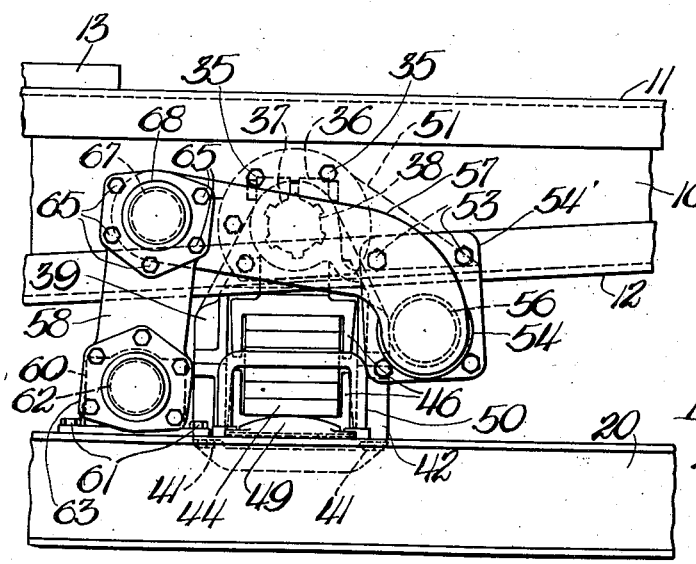

2,119,785

UNITED STATES PATENT OFFICE 2,119,785

TRACK TYPE TRACTOR

Edward A. Johnston, Chicago, Ill., assignor to International Harvester Company, a corporation of New Jersey Application February 24, 1936, Serial No. 65,337

14 Claims. (Cl. 305—9)

The invention relates to track type tractors. In tractors of this type, a main frame or body structure is mounted on the usual two opposite side crawler units by means of a three-point suspension, so that, when the crawler devices operate over uneven terrain, undue stresses and strains will not be imparted to the main frame or body structure to cause disalignment of superstructure parts and the like carried thereby. This three-point suspension is usually provided by means of a rear axle which may be a solid piece or comprise aligned, transverse stub axles. This axle has its ends, (or when stub axles are used, they each have an end), projecting laterally out of the body to which the rear end of the truck frame of the crawler devices is pivotally connected. In other words, each truck frame adjacent its rear end is pivotally connected to the axle structure, so that each truck frame disposed at the side of the body may oscillate up or down when traveling over uneven ground. The forward portion of the body has its weight transmitted to the crawler track frames by means of a third point suspension provided by means of an equalizer bar which is disposed transversely underneath the body and usually connected thereto intermediately of its ends by means of a central, longitudinal, horizontal pivot with the ends of the equalizer either resting on the respective crawler truck frames or being otherwise connected thereto.

In heavy duty tractors of this general type, there is a tendency for the crawler truck track frames, as they move through a vertical arc at their front ends, to develop a lateral motion relative to the body and main frame, which is highly objectionable, since such motion transmits severe strains to the body. To overcome this, it has been proposed to provide stabilizing devices usually in the form of a crank, which crank stabilizing devices are appropriately connected between the sides of the body and the adjacent crawler track frames, to prevent this objectionable lateral swinging tendency of the crawler track frames and without interfering with the vertical oscillatory movement that is necessary for the crawler track frames to have. In other words, these stabilizing devices insure that the forward ends of the crawler track frames will oscillate in vertical planes and in parallelism with the sides of the main frame or body.

The present known types of stabilizers for heavy duty crawler tractors have not proven satisfactory, and it is the main object of this invention to provide an improved type of stabilizer for the purposes stated.

Another object of the invention is to provide an improved crank type of stabilizer connection between the main frame on each side thereof and an adjacent crawler track frame.

Another object is to provide a unitary device including the equalizer bar and crank stabilizer whereby manufacture of the unit will be facilitated and its assembly into and removal from the tractor will be made relatively simple.

Another object of the invention is to provide a novel mounting means for the equalizer as well as an improved means for operatively associating the stabilizers with the body and track frames.

Still another object is to locate the equalizer bar transversely and parallel to the axes of the crank portions of the stabilizers with the equalizer located between the axes of the crank portions of the stabilizers to result in a compact arrangement.

Another object of the invention is to provide a unit of the kind stated embodying the equalizer and stabilizer cranks, wherein the cheek portion of the crank spans or overlies the adjacent end of the equalizer bar where it is resting on or connected to the crawler type frame.

These desirable objects may be achieved in a crawler tractor wherein the main frame is generally suspended on crawler track side frames by means of the well known three-point suspension principle and in which the forward portion of the main frame carries a cross-bolster in the form of a stationary dead axle or shaft. Carried by this bolster shaft intermediately of its ends and rigidly connected thereto is a depending hanger bracket, which at its lower end provides a cylindrical bearing surface forming a longitudinal, horizontal bearing in which is pivotally mounted the cylindrical bearing portion formed midway between the ends of an equalizer bar, which preferably is formed of a leaf spring pack. The opposite ends of the equalizer spring respectively rest on the top surfaces of the adjacent crawler track frames, or the ends of said spring may otherwise be connected to said track frames in any desirable manner.

The ends of the dead axle bolster structure adjacent each side of the main frame or body have rigidly secured thereto forwardly extending brackets. Each bracket at its front end forms a transverse journal block for rotatably carrying on a transverse, horizontal axis the inwardly extending shaft portion of a crank, the cheek portion of which extends rearwardly alongside the main frame and overspanning the adjacent end of the equalizer spring, said cheek portion generally extending rearwardly and substantially horizontally over the top surface of the adjacent crawler track frame. The rear end of the cheek portion of the stabilizer includes a transversely and outwardly extending shaft portion which is journaled for rotation on a transverse horizontal axis formed by bearings carried at the upper ends of a depending link or bracket structure, which is rockable on a transverse horizontal shaft journaled on the top of the track frame. The axes of the shaft portions of the crank are parallel and the axis of the pivot bracket structure associated therewith is also in parallelism with the axes of the crank shaft.

There is a stabilizer unit of the type described on each side of the main frame of the tractor, so that both track devices will be independently stabilized in their movement in relation to the main frame.

In the accompanying sheets of drawings, wherein is illustrated one practicable form which the invention may assume in practice:

Figure 2 is an enlarged, transverse view, partly in section, taken substantially along the line 2—2 in Figure 1, looking in the direction of the arrows;

Figure 3 is a detail, horizontal, sectional view to show the manner of pivotally connecting the rear ends of the track frames to the rear axle structure of the tractor;

Figure 4 is an enlarged, detail plan view of one of the stabilizers connecting the main frame and an adjacent crawler track frame;

Figure 5 is a side elevational view of the structure shown in Figure 4; and,

Figure 6 is a transverse cross sectional view taken through the equalizer mounting and viewed along the line 6—6 of Figure 4, looking in the direction of the arrows.

Figure 1:
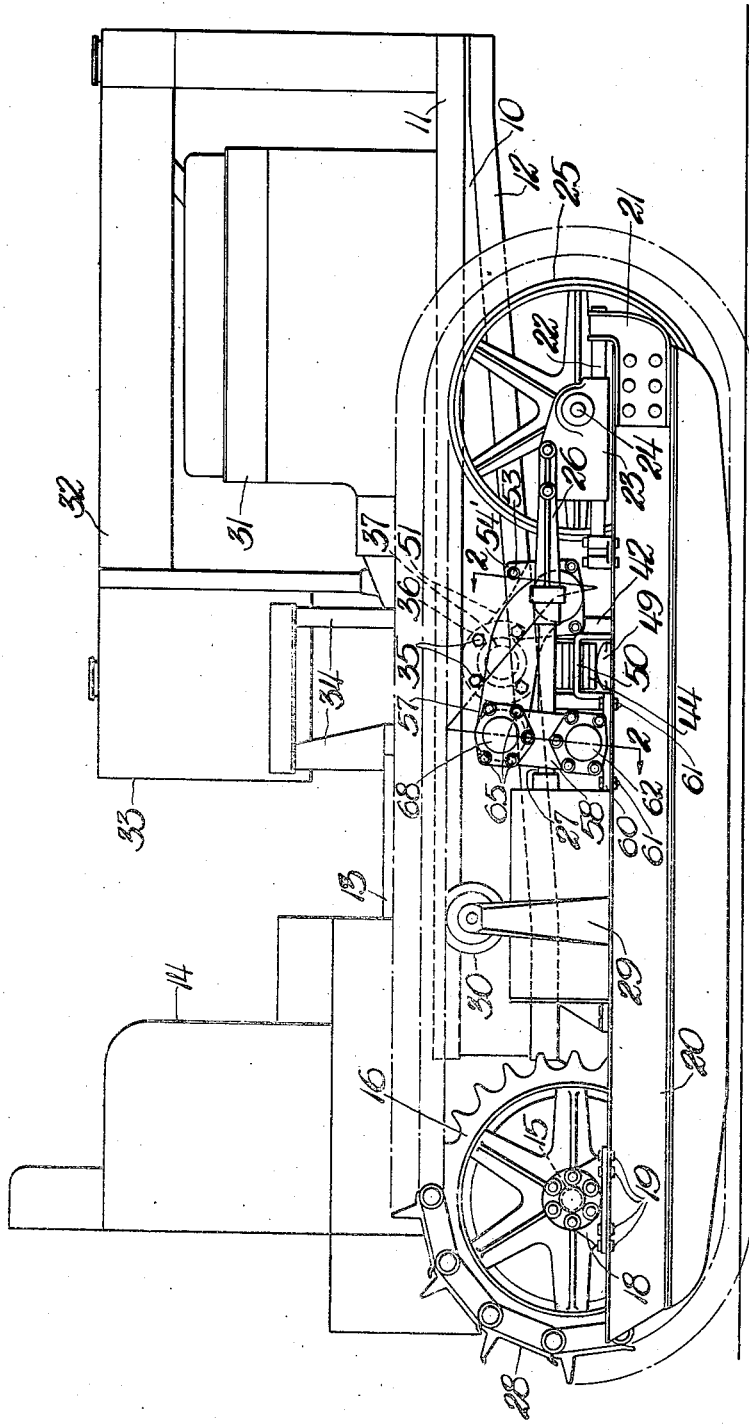
Figure 1 is a general side elevational view of a tractor showing the improved stabilizer.

The main frame of the tractor, as shown in Figures 1 and 2, in this instance is primarily composed of a pair of sheet metal side plates 10, which are longitudinally disposed in spaced relation with the plates lying in vertical planes. The upper edge of each of these plates is horizontally disposed and is reenforced by an upper angle-bar 11, which has its horizontal flange inturned, as shown in Figure 2. The lower edge of each side plate 10 is inclined, so that the plates at their forward ends are narrowest in a vertical direction and at their rear ends are widest in a vertical direction, said lower edge of each plate being reenforced by another angle-bar 12, which angle-bars 12 on the respective side plates 10 also have horizontal flanges which are inturned. The wide rear portions of these side plates 10 are appropriately secured to a large rear transmission box 13, which box serves as a cross-connecter between the two plates 10, to form the rear end of the main frame or tractor body. This rear box portion 13 carries a driver's seat 14, and it will be noted that the said box 13 extends some distance rearwardly of the rear ends of the side plates 10.

This rearwardly projected portion of the box 13, as shown in Figures 1 and 3, in any appropriate manner is formed with journals for mounting a rear transverse axle 15. This axle 15 may be a continuous dead axle, or it may comprise a pair of transversely aligned stub axles. In the present embodiment, the axle 15 is a dead axle and does not turn, and it has its opposite ends projecting laterally of the sides of the box 13, said extended ends respectively carrying the rear driving sprocket wheels 16 for driving the opposite side endless tracks presently to be described.

As shown in Figures 1 and 3, the projected ends of the axle 15 carry ball mountings 17 surrounded by a clamp bracket 18 having a spherical bearing surface embracing the ball 17. This bracket 18, by means of bolts 19 is securely fastened to the top side of a respective pair of roller track frames 20.

There is one such track frame 20 on each side of the tractor and the rear ends thereof, it will now be seen, are pivotally connected by means of the ball joint shown in Figure 3 for up and down oscillating movement about the axis of the shaft 15. These truck or side frames 20 extend forwardly a substantial distance alongside the body 10 of the tractor.

The forward end of each track frame 20 carries a bracket 21 for mounting a rod structure 22, on which is slidably mounted a journal block 23 carrying a transverse horizontal pivot 24 for rotatably mounting a front idler wheel 25. The journal block 23 may be moved fore and aft on the rod structure 22 to adjustably set the position of the idler wheel 25 in a fore and aft direction by means of a yoke structure 26 operable by a rod 27 in a manner well understood in this art.

The track frame 20 includes the usual track rollers, not shown, which rollers serve to transmit the weight of the body onto the ground stretch of an endless track shoe belt 28 driven by the sprocket wheels 16 and having their forward loops guided around the respective idler wheels 25. It will thus be seen that in a conventional manner the endless track shoe belt 28 on each side of the tractor is driven by a sprocket wheel 16 and guided by an idler wheel 25 with the roller truck frame 20 enveloped by the track shoe belt. A bracket 29, mounted on the roller truck frame 20, carries at its upper end an idler wheel 30 for supporting the upper run of the track shoe belt 28.

In any suitable manner the front end of the frame 10 carries an engine 31, which may include a hood 32, and at the rear end of the hood is disposed a fuel tank 33 carried in any suitable manner by a fuel tank mounting 34 on the body structure of the tractor. The space between the rear end of the fuel tank 33 and the seat 14 constitutes an operator's compartment on the portion 13 of the body where the usual controls for handling the tractor are mounted, the same not being herein shown, as they are deemed unnecessary.

The main frame or body structure 10 has its weight transmitted to the two opposite side truck frames 20 by means of the conventional three-point suspension principle. Two of these points of suspension have already been described, these weight transmitting two points of connection being at the ends of the dead axle 15 where the respective truck frames 20 are pivotally connected thereto. The third point of suspension is disposed forwardly of these two rear points of suspension and will next be described.

Referring to Figures 2, 4, 5, and 6, it will be seen that, in a forward position just to the rear of the motor, the frame plates 10 have respectively secured thereto by means of bolts 35 on their inner sides a pair of pinch bind brackets 36. Each of these brackets is tubular and has respectively mounted therein the adjacent end of a transverse bolster, or heavy shaft, 37, the ends thereof, as at 38, preferably being splined so that the pinch bind brackets 36 will securely grip the shaft 37 at its ends and definitely hold it against any possible rocking movement about its axis.

Intermediately of its ends this shaft, as shown in Figures 2 and 6, carries a depending block or hanger bracket 39, said bracket having a hollow, upper end, through which the shaft is passed. This bracket 39 is located in a central position on the shaft 37 between its ends and has its edges securely welded, as at 40, to the shaft 37 to unite the shaft and bracket as a single integral piece. Secured to the lower end of the bracket 39, by means of bolts 41, is a bearing block piece 42, said block 42 with the bracket 39 serving to provide a cylindrical bearing surface 43 extending longitudinally and horizontally.

An equalizer, preferably in the form of a spring leaf pack 44, is provided, said pack having some of its leaves held together by shackles 45 and the mid-portion of the spring being held together by upper and lower clamps 46 held together by bolts 47. These upper and lower clamp blocks 46 are formed respectively with surfaces of the same cylinder, as at 48, and this cylinder thus formed is journaled in the cylindrical bearing surface 43 heretofore described, thus providing a broad cylinder bearing for carrying the weight of the forward portion of the tractor body on the equalizer bar 44 and transmitting such weight to the opposite side truck frames 20, since the respective ends of the equalizer bar 44 are carried on the tops of said side truck frames 20, as shown in Figure 2. As shown in Figures 3 and 4, the top of each truck frame 20 carries a rounded pad 49 to receive the adjacent end of the equalizer bar 44, there also being provided a U-bolt guide 50 carried on the frame 20, so that the equalizer bar will be held down onto the truck frames 20.

The cylinder pivot bearing 48 provides the third point of suspension for transmitting the weight of the tractor body to the side crawler track frame units. As the tractor operates over uneven ground, the side crawler track frames 20 oscillate in vertical planes about their pivots on the axis of the shaft 15. The equalizer bar permits the truck frames 20 to rise and fall in this fashion independently of one another and, when one track frame is raised at its front end and loses traction, the equalizer bar acts as a lever which transmits a down force at the opposite side track to cause it to increase its tractive effort on the ground. It so happens in practice, that, as the front ends of the track frames 20 rise and fall through a vertical arc, they sometimes objectionally tilt laterally and are drawn in toward the body of the tractor or are caused to spread away from the body of the tractor. Such in and out toeing of the track frames as they rise and fall, it is desirable to control and restrain, and for that reason this invention provides an improved form of stabilizer which serves to insure that the track frames as they rise and fall independently will be held to movement in approximately vertical parallel planes. In other words, the track frames will rise and fall in parallelism at the sides of the body and any tendency to cant or toe in and out with respect to the body of the tractor will be prevented. This is highly important since such objectionable movements cause severe stresses and strains to be transmitted to the body. The improved stabilizing mechanism will now be described.

The bracket 36 on each end of the shaft 37 includes a forward extension 51, which extends slightly downwardly and at its end adjacent the frame plates 10 carries a flange 52 secured by bolts 53 to said plate 10. Each extension 51 serves to carry on each side of the tractor a long transverse bearing sleeve 54, the inner end of which is closed by a removable cap 55 and the outer end of which is provided with a turned-up flange 54' also secured by the bolts 53 to the side frame portions 10 and 12. Rockably journaled in this long, transverse bearing 54 is a transverse inwardly extending shaft portion 56 of a crank, which includes an upwardly and rearwardly extending cheek portion 57 lying over and spanning the respective ends of the equalizer bar 44 over the adjacent side truck frame 20.

As shown in Figure 3, each stabilizer unit includes a pair of upstanding levers or brackets 58 having bearing portions 59 journaled on a bearing sleeve bracket 60 appropriately secured by bolts 61 to the top of the respective track frames 20. The bearing 60 on each track frame 20 further carries a transverse shaft 62 on which the brackets rock at their lower ends, said brackets extending vertically upwardly, as shown in Figure 5, at a point just rearwardly of the end of the equalizer spring. The outer end of the shaft 62 is closed by a cap 63 carried on the outer arm 58, as shown in Figure 2.

The inner arm 58 in each stabilizing set at its upper end carries a long transverse sleeve extension 64, which has its free end secured by bolts 65 to the upper end of the outer arm 58. The upper end of the outer arm 58 and the outer portion of the sleeve 64 carry a bearing 66 for mounting rockably an outwardly extending, transverse crank shaft portion 67 formed integrally with the cheek 57. It will thus be seen that each stabilizer crank is integrally formed and comprises an inwardly extending shaft portion 56, a rearwardly extending cheek portion 57, and an outwardly extending shaft portion 67. The outer end of each bearing structure 64—66 is closed by a cap 68 held in place by the bolts 65 heretofore mentioned. Further, the inner end of each shaft 62 is closed off by a cap 69 secured to the bracket 58. The use and operation of the improved equalizer and stabilizing unit will now be described.

By means of the forward or third point of suspension 48 and the transverse equalizer 44 with its ends resting on the respective side track frames 20, the said frames 20 are permitted a free, independent rising and falling movement pivotally about the respective two rear points of suspension generally indicated at 17. The stabilizing crank structures described, due to their connection between the body 10 of the tractor and the respective crawler frames 20, act to restrain any tendency which the said side frames 20 might have at their forward ends to toe in toward the main frame 10 or to spread laterally away therefrom. The broad bearings provided by the shaft portions of the cranks effectively serve to hold the track frames 20 for true vertical movements in parallelism with the sides of the main frame 10. The ball joint 17, providing a pivotal connection for the rear ends of the truck frames 20, are so constructed that the frames 20 cannot rock transversely, the ball joint being merely provided to facilitate manufacture and assembly of the track frames 20, so that, when the track frame 20 is assembled with the axle ends 15, manufacturing imperfections can be compensated for. The ball joint is not designed or provided to permit any transverse rocking or tilting movements of the crawler unit frames.

It will further be noted that the rear crank portion 67 of each stabilizing crank is normally disposed slightly higher than the forward shaft portions 56 thereof, and any relative fore and aft movement between the main frame 10 and the crawler frames 20 is taken care of by the fore and aft swinging lever arm brackets 58 which rock about the axis of the shafts 62. A compact assembly results from the fact that the stabilizer crank portion 57 spans the equalizer bar 44 at its ends, and, by means of this compact arrangement, the common member 37 can be included in the frame 10 for both mounting the stabilizer 44 and for journaling the inwardly extending shaft portions of the crank stabilizers. Thus, the stabilizing action of the cranks is applied at that portion of the structure between the crawler devices and the main frame where the forward portion of the weight of the main frame is transmitted through its third point of suspension to the side crawler frames.

Another very desirable feature of this structure is that the bolster unit 37 with the equalizer 44 and the crank stabilizers can be separately assembled as a unit in manufacturing the same and in the same manner be assembled as a unit into the tractor, thereby facilitating production of the tractor.

It is the intention to cover all changes of the illustrative form of the invention herein shown which do not in material respects constitute departures therefrom as indicated by the definitions of the invention comprising the following claims.

What is claimed is:

1. In a tractor having a longitudinal central body and longitudinal side frames arranged on opposite sides thereof with their rear ends pivotally attached to the rear portion of the body on a transverse axis for swinging movement in parallel planes, a transverse equalizer bar having a central weight transmitting connection with the forward portion of the body and having its ends respectively mounted on the side frames, a stabilizer for each side frame comprising a crank, each crank having a transverse inwardly extending shaft portion rockably mounted in a bearing carried by the body and an outwardly extending parallel shaft portion rockably mounted on a bearing, the cheek portions of the cranks spanning the proximate ends of the equalizer bar, another parallel shaft for each stabilizer journaled on each side frame, and an upright swingable bracket mounted on each of the last mentioned shafts to support the bearings for the respective outwardly extending shaft portions of the cranks.

2. In a tractor having a longitudinal central body and longitudinal side frames arranged on opposite sides thereof with their rear ends pivotally attached to the rear portion of the body on a transverse axis for swinging movement in parallel planes, a transverse equalizer bar having a central weight transmitting connection with the forward portion of the body and having its ends respectively mounted on the side frames, a stabilizer for each side frame comprising a crank, each crank having an inwardly extending shaft portion rockably mounted in a transverse bearing carried by the body and an outwardly extending shaft portion, a pivotally mounted bracket carried on each side frame including a bearing for rockably mounting on a transverse axis the outwardly extending shaft portion of a crank, the cheek portions of the cranks spanning the proximate ends of the equalizer bar, and a common support included in the body for operatively connecting the equalizer and stabilizers to the body as a unit in operative relationship to the body and side frames.

3. In a tractor having a longitudinal central body and longitudinal side frames arranged on opposite sides thereof with their rear ends pivotally attached to the rear portion of the body on a transverse axis for swinging movement in parallel planes, a bolster disposed transversely across the body in a forward position thereon, a bracket rigidly carried by the bolster intermediate its ends and providing a longitudinal central bearing, a transverse equalizer bar having its ends mounted on the side frames and an intermediate part to fit the bearing in said bracket, a stabilizer for each side frame comprising a crank, each crank having a transverse shaft portion extending inwardly and journaled in a bearing bracket hung from the adjacent end of the bolster, each crank having a transverse shaft portion extending outwardly, said outward shaft portion being rockably mounted in a bearing carried on the adjacent side frame, and a cheek portion for each crank connecting the shaft portions thereof.

4. In a tractor having a longitudinal central body and longitudinal side frames arranged on opposite sides thereof with their rear ends pivotally attached to the rear portion of the body on a transverse axis for swinging movement in parallel planes, a bolster disposed transversely across the body in a forward position thereon, a bracket rigidly carried by the bolster intermedite its ends and providing a longitudinal central bearing, a transverse equalizer bar having its ends mounted on the side frames and an intermediate portion formed to fit the bearing in said bracket, a stabilizer for each side frame comprising a crank, each crank having a transverse shaft portion extending inwardly parallel with the bolster and journaled in a bearing bracket hung from the adjacent end of the bolster, each crank having a transverse shaft portion extending outwardly in parallel with the bolster, said outward shaft portion being rockably mounted in a bearing carried on the adjacent side frame, and a cheek portion for each crank connecting the shaft portions thereof.

5. In a tractor having a longitudinal central body and longitudinal side frames arranged on opposite sides thereof with their rear ends pivotally attached to the rear portion of the body on a transverse axis for swinging movement in parallel planes, a bolster disposed transversely across the body in a forward position thereon, a bracket rigidly carried by the bolster intermediate its ends and providing a longitudinal central bearing, a transverse equalizer spring having its ends resting slidably on the side frames and an intermediate part pivotally mounted in the bearing in said bracket, a stabilizer for each side frame comprising a crank, each crank having a shaft portion extending inwardly and journaled in a bearing bracket carried by the adjacent end of the bolster, each crank having a shaft portion extending outwardly, said outward shaft portion being rockably mounted in a bearing carried on the adjacent side frame, and a cheek portion for each crank connecting the shaft portions thereof and spanning the ends of the equalizer.

6. In a tractor having a longitudinal central body and longitudinal side frames arranged on opposite sides thereof with their rear ends pivotally attached to the rear portion of the body on a transverse axis for swinging movement in parallel planes, a cross shaft rigidly disposed transversely across the body in a forward position thereon, a bracket rigidly carried by the cross shaft intermediate its ends and providing a longitudinal central bearing, a transverse equalizer bar having its ends mounted on the side frames and an intermediate portion formed to fit the bearing in said bracket, a stabilizer for each side frame comprising a crank, each crank having a transverse shaft portion extending inwardly parallel with the cross shaft and journaled in a bearing bracket rigidly carried by the adjacent end of the cross shaft, each crank having a transverse shaft portion extending outwardly in parallel with the cross shaft, said outward shaft portion being rockably mounted in a bearing carried on the adjacent side frame, and a cheek portion for each crank connecting the shaft portions thereof.

7. In a tractor having a longitudinal central body and longitudinal side frames arranged on opposite sides thereof with their rear ends pivotally attached to the rear portion of the body on a transverse axis for swinging movement in parallel planes, a cross shaft rigidly disposed transversely across the body in a forward position thereon, a bracket rigidly carried by the cross shaft intermediate its ends and providing a longitudinal central bearing, a transverse equalizer spring having its ends mounted on the side frames and an intermediate pivot to fit the bearing in said bracket, a stabilizer for each side frame comprising a crank, each crank having a transverse shaft portion extending inwardly parallel with the cross shaft and journaled in a bearing bracket rigidly supported from the adjacent end of the cross shaft, each crank having a transverse shaft portion extending outwardly in parallel with the cross shaft, said outward shaft portion being rockably mounted in a bearing carried on the adjacent side frame, and a cheek portion for each crank connecting the shaft portions thereof and spanning one end of the equalizer.

8. In a tractor having a longitudinal central body and longitudinal side frames arranged on opposite sides thereof with their rear ends pivotally attached to the rear portion of the body on a transverse axis for swinging movement in parallel planes, a bolster adapted to be disposed transversely across the body in a forward position thereon, a bracket carried by the bolster intermediate its ends and providing a longitudinal central bearing, a transverse equalizer having its ends adapted to be mounted on the side frames and an intermediate pivot to fit the bearing in said bracket, a stabilizer for each side frame comprising a crank, each crank having a transverse shaft portion extending inwardly and journaled in a bearing bracket carried by the adjacent end of the bolster, each crank having a transverse shaft portion extending outwardly, said outward shaft portion adapted to be rockably mounted in a bearing carried on the adjacent side frame, and a cheek portion for each crank connecting the shaft portions thereof, said bolster carrying the equalizer and stabilizers to provide an assembled unit.

9. The combination with a tractor having a longitudinal central body and longitudinal side frames arranged on opposite sides thereof with their rear ends pivotally attached to the rear portion of the body on a transverse axis for swinging movement in parallel planes, of a unitary assembly for mounting the forward portion of the body on the side frames comprising a bolster adapted to be disposed transversely across the body in a forward position thereon, a bracket rigidly carried by the bolster intermediate its ends and providing a longitudinal central bearing, a transverse equalizer having its ends adapted to be mounted on the side frames and an intermediate portion including a pivot to fit the bearing in said bracket, a stabilizer for each side frame comprising a crank, each crank included in the unit and having a transverse shaft portion extending inwardly and journaled in a bearing bracket mounted on the adjacent end of the bolster, each crank having a transverse shaft portion extending outwardly, said outward shaft portion being rockably mounted in a bearing adapted to be carried on the adjacent side frame, and a cheek portion for each crank connecting the shaft portions thereof.

10. In a tractor having a longitudinal main frame including a pair of side members, longitudinal side frames arranged on opposite sides of the frame with their rear ends pivotally attached to the rear end of the main frame on a transverse axis for swinging movement in parallel planes, a bolster disposed transversely across the main frame with its ends secured to the inner face of the side members, each end of the bolster carrying a forwardly extending bracket providing a transverse bearing, said bolster intermediate its ends carrying a depending bracket providing a longitudinal bearing, an equalizer bar disposed transversely under the main frame with its ends mounted on the respective side frames and its mid-portion including a pivot to fit and be carried rockably in said longitudinal bearing, a stabilizer for connecting each side frame with the main frame comprising a crank, each crank including a transverse shaft portion extending inwardly and journaled in the adjacent transverse bearing, each side frame carrying a bearing for journaling an outwardly extending transverse shaft portion of each crank, and the crank shaft portions being connected by a cheek portion.

11. In a tractor having a longitudinal main frame including a pair of side members, longitudinal side frames arranged on opposite sides of the frame with their rear ends pivotally attached to the rear end of the main frame on a transverse axis for swinging movement in parallel planes, a shaft disposed transversely across the main frame with its ends secured to the inner face of the side members, each end of the shaft carrying a forwardly extending bracket providing a transverse bearing, said shaft intermediate its ends carrying a depending bracket providing a longitudinal bearing, an equalizer spring disposed transversely under the main frame with its ends mounted on the respective side frames and its mid-portion formed with a portion to fit and be carried rockably in said longitudinal bearing, a stabilizer for connecting each side frame with the main frame comprising a crank, each crank including a transverse shaft portion extending inwardly and journaled in the adjacent transverse bearing, each side frame swingably carrying a bearing for journaling an outwardly extending transverse shaft portion of each crank, and the crank shaft portions being connected by a cheek portion.

12. In a tractor having a longitudinal main frame including a pair of side members, longitudinal side frames arranged on opposite sides of the frame with their rear ends pivotally attached to the rear end of the main frame on a transverse axis for swinging movement in parallel planes, a shaft disposed transversely across the main frame with its ends splined and secured to the inner face of the side members, each splined end of the shaft carrying a forwardly extending bracket providing a transverse bearing, said shaft intermediate its ends having welded thereto a depending bracket providing a longitudinal bearing, an equalizer disposed transversely under the main frame with its ends mounted on the respective side frames and its mid-portion including a pivot to fit and be carried rockably in said longitudinal bearing, a stabilizer for connecting each side frame with the main frame comprising a crank, each crank including a transverse shaft portion extending inwardly and journaled in the adjacent transverse bearing, each side frame carrying a bearing for journaling an outwardly extending transverse shaft portion of each crank, and the crank shaft portions being connected by a cheek portion.

13. In a tractor having a longitudinal main frame including a pair of side members, longitudinal side frames arranged on opposite sides of the frame with their rear ends pivotally attached to the rear end of the main frame on a transverse axis for swinging movement in parallel planes, a bolster disposed transversely across the main frame with its ends secured to the inner faces of the side members, each end of the bolster carrying a forwardly extending bracket providing a transverse bearing, said bolster intermediate its ends carrying a depending bracket providing a longitudinal bearing, an equalizer disposed transversely under the main frame with its ends mounted on the respective side frames and its mid-portion formed with a portion to fit and be carried rockably in said longitudinal bearing, a stabilizer for connecting each side frame with the main frame comprising a crank, each crank including a transverse shaft portion extending inwardly in advance of the equalizer and journaled in the adjacent transverse bearing, each side frame carrying a bearing for journaling an outwardly extending transverse shaft portion of each crank rearwardly of the equalizer, and the crank shaft portions being connected by a cheek portion which spans one end of the equalizer.

14. In a tractor having a longitudinal main frame including a pair of side members, longitudinal side frames arranged on opposite sides of the frame with their rear ends pivotally attached to the rear end of the main frame on a transverse axis for swinging movement in parallel planes, a bolster disposed transversely across the main frame with its ends secured to the inner faces of the side members, each end of the bolster carrying a forwardly extending bracket providing a transverse bearing, said bolster intermediate its ends carrying a depending bracket providing a longitudinal bearing, an equalizer bar disposed transversely under the main frame with its ends mounted on the respective side frames and its mid-portion including a pivot to fit and be carried rockably in said longitudinal bearing, a stabilizer for connecting each side frame with the main frame comprising a crank, each crank including a transverse shaft portion extending inwardly and journaled in the adjacent transverse bearing, a transverse shaft journaled on each side frame, an upright pivot bracket carried on each transverse shaft, each pivot bracket carrying a bearing for journaling an outwardly extending transverse shaft portion of each crank, and the crank shaft portions being connected by a cheek portion.

EDWARD A. JOHNSTON.